(12) United States Patent
Rahman

(10) Patent No.: US 10,805,671 B2
(45) Date of Patent: *Oct. 13, 2020

(54) SATELLITE TV USER COMMUNITY SMART DEVICE MONITORING AND MANAGEMENT

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,872

(22) Filed: Apr. 5, 2019

(65) Prior Publication Data

US 2019/0238926 A1    Aug. 1, 2019

Related U.S. Application Data

(63) Continuation of application No. 15/239,931, filed on Aug. 18, 2016, now Pat. No. 10,298,996.

(51) Int. Cl.
*H04N 21/436* (2011.01)
*H04L 12/24* (2006.01)
(Continued)

(52) U.S. Cl.
CPC ....... *H04N 21/436* (2013.01); *H04L 41/0618* (2013.01); *H04L 41/0631* (2013.01);
(Continued)

(58) Field of Classification Search
None
See application file for complete search history.

(56) References Cited

U.S. PATENT DOCUMENTS 5,923,834 A    7/1999    Thieret et al.
6,175,934 B1   1/2001    Hershey et al.
(Continued)

FOREIGN PATENT DOCUMENTS

EP    2911340         8/2015
EP    2914022 A1      9/2015
(Continued)

OTHER PUBLICATIONS

Deshpande, Bala, IoT and the future of fault detection and preventive maintenance, Simafore, simafore.com, Sep. 22, 2015.
(Continued)

*Primary Examiner* — Alexander Q Huerta
(74) *Attorney, Agent, or Firm* — Guntin & Gust, PLC; Andrew Gust

(57) ABSTRACT

Aspects of the subject disclosure may include, for example, a method that includes collecting operational data from a plurality of premises devices over a satellite service provider network for subscribers of the satellite provider network, wherein the operational data includes premises device data for each premises device of a subscriber, detecting an error indication in premises device data of one of the plurality of premises devices, determining a mitigation action to the error indication in the premises device data for the one of the plurality of premises devices, determining if the error indication in the operational data is indicative of a system wide problem for a type of equipment of the one of the plurality of premises devices, and updating the type of equipment across the satellite provider network with the mitigation action responsive to determining that the error is indicative of the system wide problem. Other embodiments are disclosed.

20 Claims, 6 Drawing Sheets

(51) Int. Cl.
  *H04N 21/61* (2011.01)
  *H04N 21/41* (2011.01)
  *H04N 21/442* (2011.01)
  *H04N 21/654* (2011.01)
  *H04N 21/658* (2011.01)
  *H04L 29/08* (2006.01)

(52) U.S. Cl.
  CPC ..... *H04L 41/0893* (2013.01); *H04N 21/4131* (2013.01); *H04N 21/44231* (2013.01); *H04N 21/6143* (2013.01); *H04N 21/6193* (2013.01); *H04N 21/654* (2013.01); *H04N 21/6582* (2013.01); *H04L 41/069* (2013.01); *H04L 67/02* (2013.01); *H04L 67/12* (2013.01)

(56) References Cited

U.S. PATENT DOCUMENTS

| | | | |
|---|---|---|---|
| 6,374,079 B1 | 4/2002 | Hsu et al. | |
| 6,445,907 B1 | 9/2002 | Middeke et al. | |
| 7,120,819 B1 | 10/2006 | Gürer et al. | |
| 7,188,482 B2 | 3/2007 | Sadegh et al. | |
| 7,739,717 B1 | 6/2010 | Kuether et al. | |
| 7,904,187 B2 | 3/2011 | Hoffberg et al. | |
| 8,171,351 B1 | 5/2012 | Tomay et al. | |
| 8,418,215 B2* | 4/2013 | Boatright | H04L 41/5074 725/107 |
| 8,938,749 B2 | 1/2015 | Yang et al. | |
| 9,026,639 B2 | 5/2015 | Kelley et al. | |
| 9,026,840 B1 | 5/2015 | Kim | |
| 9,037,896 B2 | 5/2015 | Addepalli et al. | |
| 9,213,325 B2 | 12/2015 | Ploix et al. | |
| 9,369,919 B2 | 6/2016 | Chakrabarti et al. | |
| 9,372,922 B2 | 6/2016 | Shaashua et al. | |
| 2003/0126258 A1 | 7/2003 | Conkright et al. | |
| 2004/0093370 A1* | 5/2004 | Blair | H04N 17/02 709/200 |
| 2005/0183130 A1* | 8/2005 | Sadja | H04N 7/17309 725/107 |
| 2005/0289558 A1 | 12/2005 | Illowsky et al. | |
| 2006/0230312 A1* | 10/2006 | Nichols | G06F 11/2294 714/25 |
| 2008/0022336 A1* | 1/2008 | Howcroft | H04L 12/2801 725/100 |
| 2008/0168517 A1 | 7/2008 | Allen | |
| 2009/0028056 A1 | 1/2009 | Rahman et al. | |
| 2009/0106809 A1 | 4/2009 | Rahman | |
| 2009/0157674 A1* | 6/2009 | Curry | G06F 16/217 |
| 2009/0296000 A1 | 12/2009 | Pal | |
| 2010/0169712 A1 | 7/2010 | Argue et al. | |
| 2010/0324855 A1* | 12/2010 | Parker | G06F 11/2294 702/119 |
| 2011/0213871 A1 | 9/2011 | DiGirolamo et al. | |
| 2011/0228665 A1* | 9/2011 | Kumar | G06Q 10/06 370/216 |
| 2012/0233605 A1 | 9/2012 | Lupu et al. | |
| 2013/0057704 A1* | 3/2013 | Savoor | G06F 11/2294 348/180 |
| 2013/0061277 A1* | 3/2013 | Mallya | H04W 52/244 725/109 |
| 2013/0316754 A1 | 11/2013 | Skog et al. | |
| 2014/0130111 A1* | 5/2014 | Nulty | H04N 17/004 725/107 |
| 2015/0067154 A1 | 3/2015 | Ly et al. | |
| 2016/0070614 A1 | 3/2016 | Joshi et al. | |
| 2016/0099963 A1 | 4/2016 | Mahaffey et al. | |
| 2016/0203036 A1 | 7/2016 | Mezic et al. | |
| 2017/0063474 A1 | 3/2017 | Humphrey et al. | |
| 2018/0054655 A1 | 2/2018 | Rahman | |

FOREIGN PATENT DOCUMENTS

| | | |
|---|---|---|
| EP | 3010182 A1 | 4/2016 |
| WO | 2012177038 A2 | 12/2012 |
| WO | 2015036791 A1 | 3/2015 |

OTHER PUBLICATIONS

Lammers, David , Cover Story: Fabs in the Internet of Things Era, Applied Materials®, appliedmaterials.com, Dec. 2013.
Liu, Yu et al., A self-learning sensor fault detection framework for industry monitoring IoT, Mathematical problems in engineering 2013.
Xu, Li et al., Smart community: an internet of things application, IEEE Communications Magazine 49.11 (2011): 6875.

* cited by examiner

100

200

300

SATELLITE TV USER COMMUNITY SMART DEVICE MONITORING AND MANAGEMENT

CROSS REFERENCE TO RELATED APPLICATIONS

This application is a continuation of U.S. patent application Ser. No. 15/239,931 filed on Aug. 18, 2016, the contents of which are hereby incorporated by reference into this application as if set forth herein in full.

FIELD OF THE DISCLOSURE

The subject disclosure relates to a system to monitor and correct faults in a smart home environment through a satellite provider network.

BACKGROUND

Smart home environments can provide operational information about individual devices for individual households.

BRIEF DESCRIPTION OF THE DRAWINGS

Reference will now be made to the accompanying drawings, which are not necessarily drawn to scale, and wherein.

DETAILED DESCRIPTION

Figure 1:
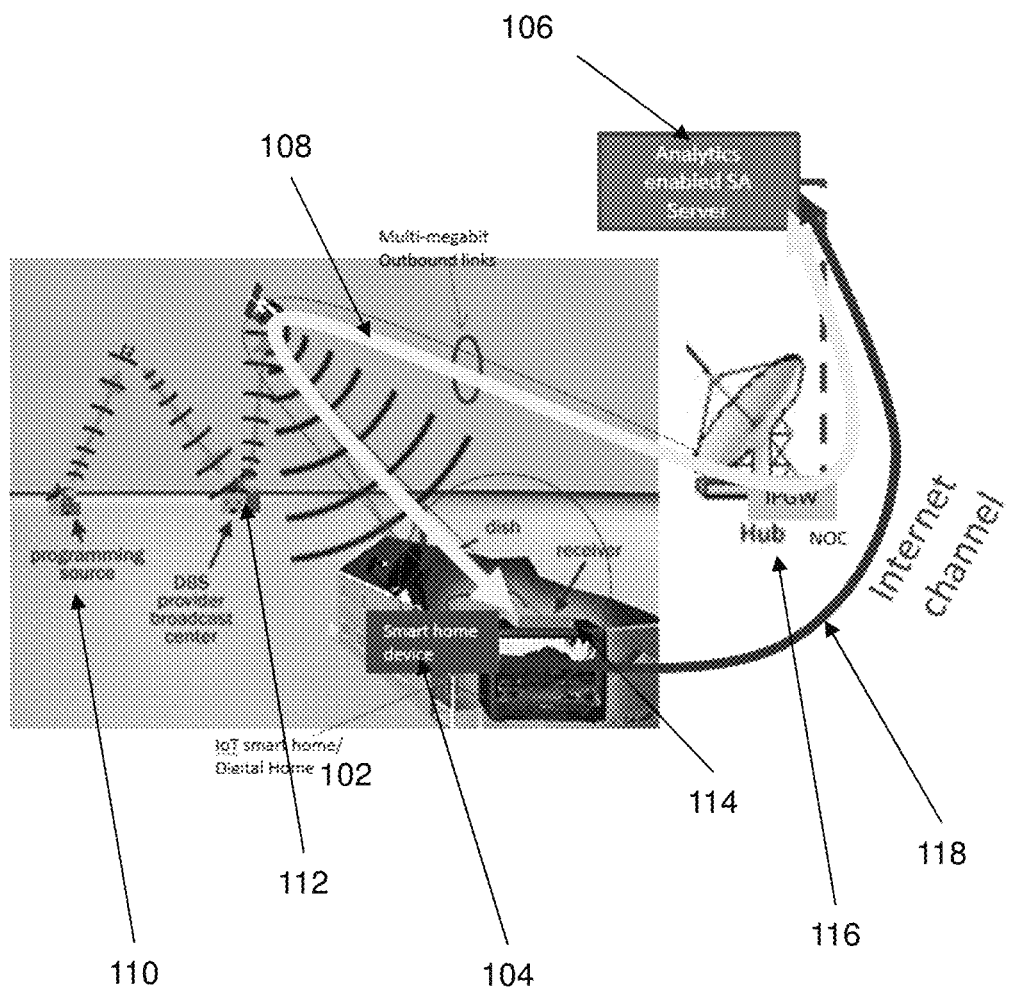
FIG. 1 depicts an illustrative embodiment of system 100.

The subject disclosure describes, among other things, illustrative embodiments for correcting errors in smart home devices and predicting and solving system wide problems those smart home devices. Other embodiments are described in the subject disclosure.

One or more aspects of the subject disclosure include a method that includes collecting, by a processing system comprising a processor, operational data from a plurality of premises devices over a satellite service provider connection of a satellite service provider network for subscribers of the satellite service provider network, wherein the operational data includes premises device data for each premises device of a subscriber, detecting, by the processing system, an error indication in premises device data of one of the plurality of premises devices, determining, by the processing system, a mitigation action to the error indication in the premises device data for the one of the plurality of premises devices, determining, by the processing system, if the error indication in the operational data is indicative of a system wide problem or error for a type of equipment of the one of the plurality of premises devices, and updating, by the processing system, the type of equipment across the satellite provider network with the mitigation action responsive to determining that the error is indicative of the system wide problem.

One or more aspects of the subject disclosure include an apparatus that includes a processing system including a processor and a memory that stores executable instructions that, when executed by the processing system, facilitate performance of operations that include collecting operational data from a plurality of premises devices of a subscriber of a media provider network, wherein the operational data includes premises device data for each premises device of the plurality of premises devices, providing the operational data to the media provider network, wherein the media provider network detects an error indication in premises device data of one of the plurality of premises devices, wherein the media provider network determines a mitigation action to the error indication in the premises device data for the one of the plurality of premises devices, receiving the mitigation action from the media provider network, and providing the mitigation action to the one of the plurality of premises devices.

One or more aspects of the subject disclosure include machine-readable storage medium, including executable instructions that, when executed by a processing system including a processor, facilitate performance of operations that include collecting operational data from a plurality of premises devices of a subscriber of media provider network, wherein the operational data includes premises device data for each premises device of the plurality of premises devices, providing the operational data to media processor, wherein the media processor provides the operational data to the media provider network, wherein the media provider network detects an error indication in premises device data of one of the plurality of premises devices, wherein the media provider network determines a mitigation action to the error indication in the premises device data for the one of the plurality of premises devices, receiving the mitigation action from the media processor, and providing the mitigation action to the one of the plurality of premises devices.

Exemplary embodiments can share common analytics enabled management service entities for network provided video services to detect common content source problem by leveraging one set of subscriber data (such as an interactive television network user device data or Satellite TV user device data) quickly. Exemplarily, a same feed is being multicast to both interactive television network and Satellite TV users. In one embodiment, by employing detecting problem leveraging analytics in one user's device can serve as a predictive maintenance tool for users and their devices. The interactive television network and Satellite TV mitigation action exemplarily allows a Head-End server to be reused between the interactive television network and Satellite TV systems. This remote failure detection capability over interactive television network and Satellite TV networks for Internet of Thing (IoT) connected smart home devices can leverage video devices, such as set-top box, for a surveillance interface capability.

The surveillance interface capability could exemplarily be invoked automatically to predict and prevent faults. Exemplarily, the surveillance interface capability can predict a failure as well determine or provide the root cause of the predicted failure. This feature can allow IoT users, such as smart home systems owner and/or a Satellite TV to be notified about the end to end health of the network, including any home devices interfacing with the network. Exemplary embodiments can pro-actively monitor and notify the smart home systems user and TV user about the health of their premises or home devices dynamically.

Exemplarily embodiments can perform detecting and isolating of faults in Satellite TV user's digital home and premises devices such as a receiver or set-top box, a low noise block down converter (LNB), remotely over a Satellite control channel or Internet connection connected to a ground IP Gateway (IPGW) that interfaces with an Analytics enabled network Service Assurance (SA) server. In additional embodiments, the digital home also can include IoT device including a smart home system where network operators offer services that connect to the home to remotely to provide services such as video monitoring, door lock control, occupancy sensing services, and security devices that could detect activities from a burglary to an unauthorized party by teenagers.

FIG. 1 illustrates an exemplary embodiment of system 100 in which a network server which includes Service Assurance (SA) server 106 that exemplarily receives a request and/or data from the user IoT premises devices 104 of a premises 102, including smart home device 104 and a Satellite TV user device 114, such as a Digital Home Device Agent over a Satellite link 108. In some embodiments, the request or data can include an indication of a problem with one of the IoT premises devices or portions of the satellite TV user devices. The SA server 106 can exemplarily use analytic logic to troubleshoot the problem, isolate the problem, and notify a user about the results of the troubleshooting. In some embodiments, both an IoT smart Digital Home and the SA server 106 include an interface over an Internet Protocol Gateway (IPGW) 116 that interfaces with a Satellite control channel.

Exemplarily, the following messaging interaction steps can take place between SA Server 106 and the Digital Home 102 via Satellite link 108 connected to IPGW 116. In other embodiments, the following messaging can take place via an Internet channel 118 (e.g., a VPN, encrypted, or otherwise secure communication path over the Internet) or other communication paths. First, an IoT digital smart home agent can push data periodically to the SA server 106. Next, the SA Server 106 can prepare and mine the collected data. Next, the SA server 106 can infer actionable intelligence from the data such as patterns or anomalies in the data for the devices. In some embodiments, the SA server 106 can push the inferred intelligence to the digital smart home agent.

In additional embodiments, an IoT digital smart home agent can detect anomalies by merging pre-defined/populated rules and real-time data streams from the IoT devices. Exemplarily, the IoT digital smart home agent can send the detected anomalies to SA server 106 over Satellite link 108 interfacing with the IPGW 116. In addition, the SA server can further mine and analyze to determine any troubleshooting measures that are necessary and to find a root cause by blending statistics with network topology (logical and physical) and to notify the IoT digital smart home agent to correct the problem.

Figure 2:
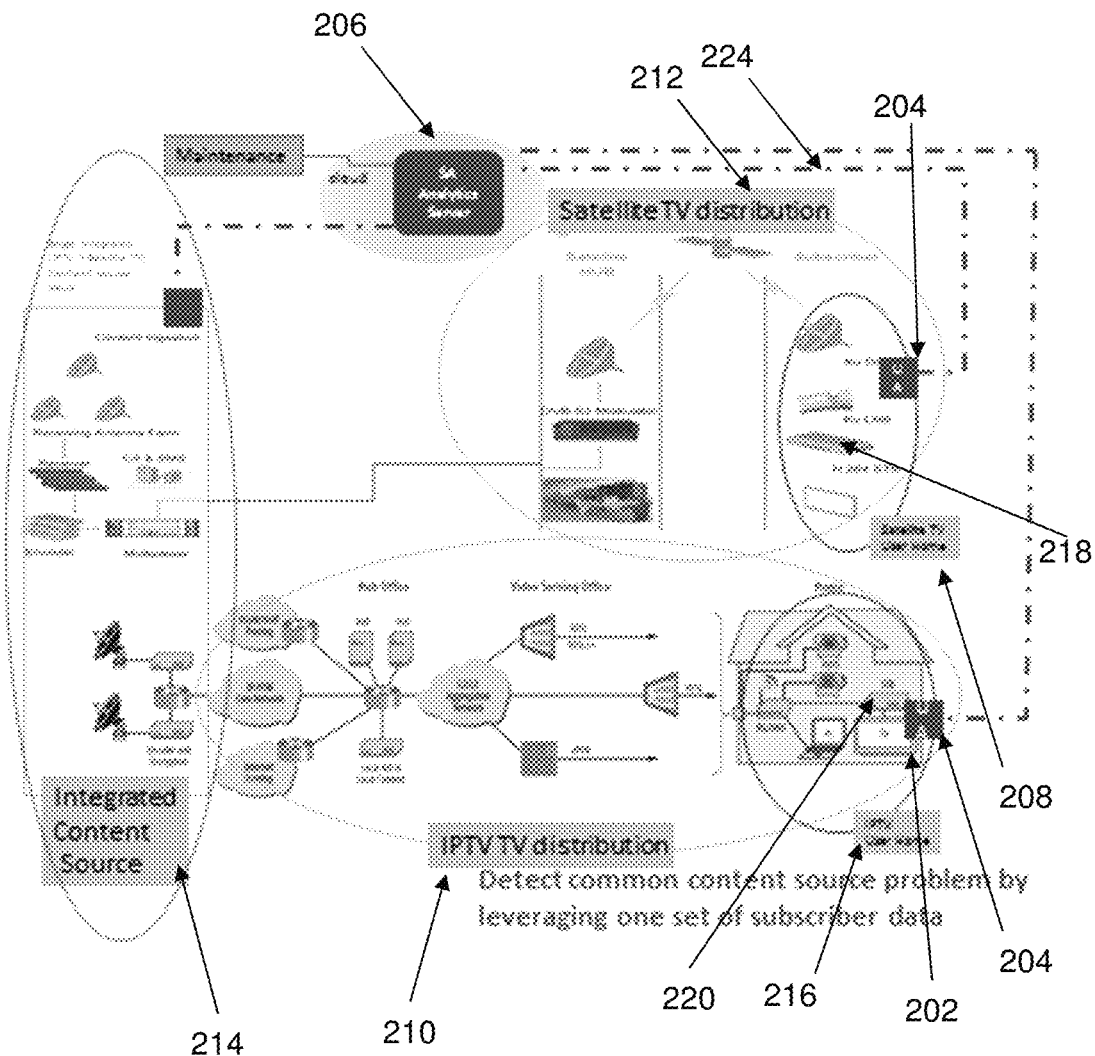
FIG. 2 depicts an illustrative embodiment of system 200.

FIG. 2 illustrates an exemplary embodiment of system 200. Exemplarily, system 200 can include a smart home premises 202 in which one or both of a satellite TV distribution system 212 and an interactive television network (ITV) 210 are provided. System 200 can exemplarily include a SA Analytics server 206 which monitors the smart home premises 202. Exemplarily, a smart home premises 202 can communicate the SA server 206 through user agent 204. Exemplarily, the user agent can include either one or both of a user agent 204 which can be referred to as an ITV user agent user 216 and a satellite TV user agent 208, depending on the type of service used at the smart home premises 202. The user agent 204 can be a device that interacts with each of device in the premises. The user agent 204 can be a stand-alone device, an existing media processor, or an application operating on a mobile communication device of the subscriber.

Exemplarily, the satellite TV distribution system 212 and ITV network 210 can receive content from integrated content source 214, among other media content sources. Exemplarily, the satellite TV distribution system 212 and ITV network 210 provide media content and other services to an ITV media processor 222 and the satellite service provider media processor 218, respectively.

Several exemplary communications can take place between SA Server 206 and the smart home premises 202 user agent 204 via a satellite link 224. Exemplarily, the satellite link 224 includes a feedback channel in which satellite user equipment located at a user's premises can provide feedback data and other information back to the satellite television network through the satellite link 224 in addition to receiving media content from the satellite television network.

The user agent 204 can exemplarily push operational data periodically to the SA server 206. The user agent 204 can exemplarily communicate with various devices in the smart home premises 202. For example, IoT enabled devices in the smart home premises 202 can communicate with the user agent 204. In addition, various media devices in the smart home premises 202 can likewise communicate with the user agent 204. In other embodiments, the IoT enabled devices can communicate with their respective media processors 220 and 218 in situations where the media processor includes or performs as a home agent.

Next, the SA server 206 exemplarily prepares and mines the collected data. Exemplarily, the SA server 206 can detect anomalies and/or faults by merging pre-defined rules and real-time data streams from a variety of smart digital home agents from multiple premises. That is, exemplarily, the SA server 206 receives condition data from the user agent 204 in the smart home premises 202 along with additional condition data from other smart home premises of other subscribers that the SA server 206 serves. Thus, the SA server 206 can receive condition data from a broad variety of IoT devices of many different types across many different households. In addition, the SA server 206 can receive operational data of satellite media processors 218.

Next, the SA server 206 can infer actionable intelligence such as patterns or anomalies rules based on the detected anomalies. These anomalies can include problems, errors, and/or substandard operational parameters from any device in the smart home premises 202 that is able to be connected to the user agent 204 or to the media processors 220 and 218.

In additional embodiments, the SA server 206 can also mine and analyze and conclude the troubleshooting and find the root cause (for example at the shared source) by blending statistic with network topology. Exemplarily, the analytics performed by the SA server 206 can notify a shared content source maintenance team or take auto-corrective action based on pre-provisioned logic to respond to the anomalies.

Figure 3:
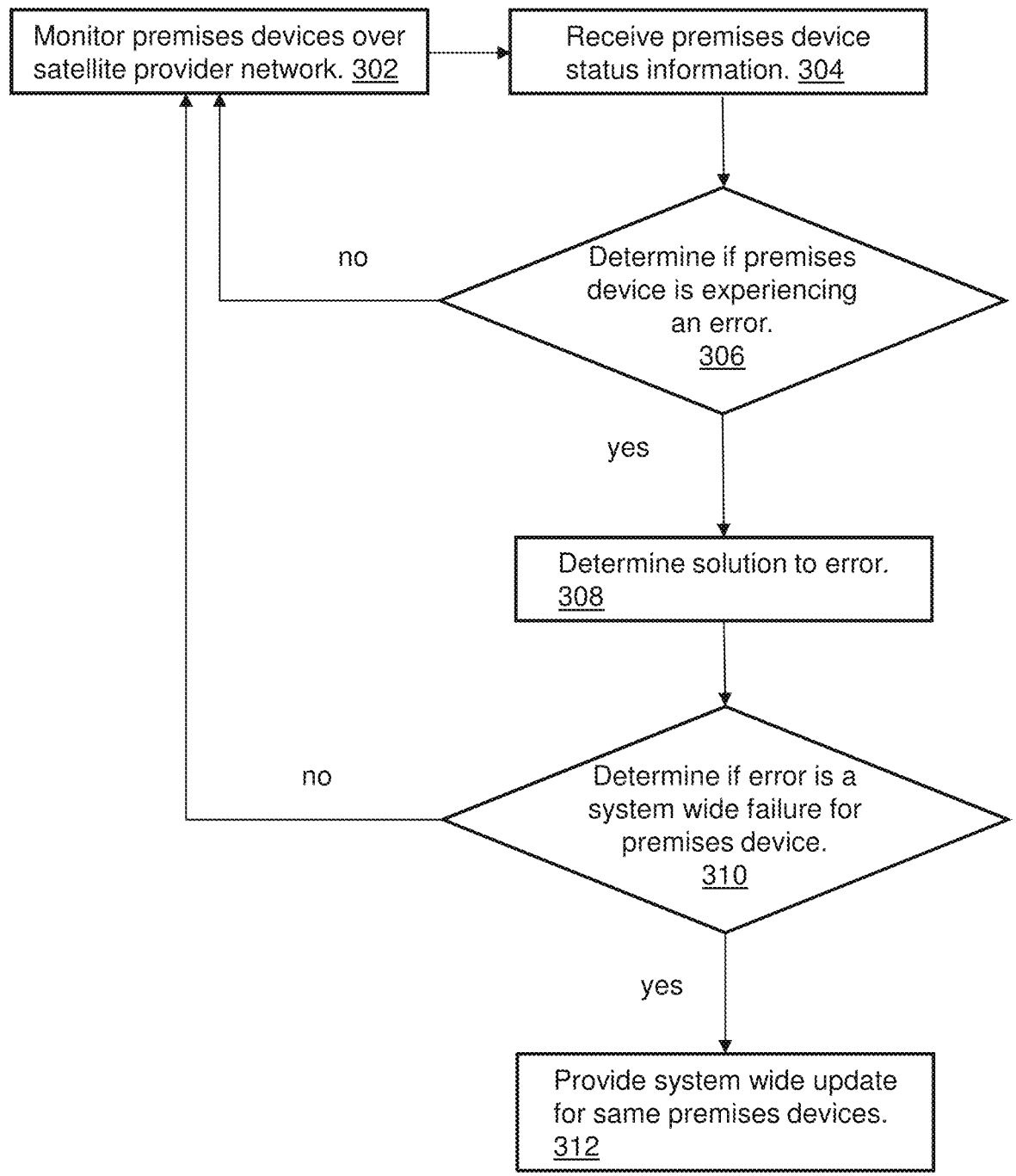
FIG. 3 depicts an illustrative embodiment of a method used in portions of the system described in FIGS. 1 and 2.

FIG. 3 illustrates an exemplary method 300. In method, 300, premises devices are monitored over a network. Exemplarily, premises devices include IoT devices in a household as well as media processors associated with an interactive television network or a satellite provider network. In some embodiments, the premises devices provide information to a user agent in a smart home. Exemplarily, the user agent can report premises condition data to a SA server over an Internet connection. In other embodiments, the user agent can report premises condition data to a SA server over a feedback channel over the satellite provider network. In other embodiments, each of the premises data can utilize a media processor, such as a set-top box, as a user agent to report the premises condition data to the SA server.

In Step 304, the SA server receives the premises condition data for different subscriber premises in the network. For example, the SA server can receive the premises condition data for subscribers in a satellite provider network or an interactive television network. Exemplarily, the SA server receives premises condition data for various premises devices in various households. Exemplarily, the SA server can receive premises condition data for each type of equipment in the various subscriber households. For example, the SA server can receive data related to different types and models of television display devices, different set-top boxes and media processors, and different IoT enabled premises devices such as kitchen appliances, HVAC systems, small appliances, media devices, computing devices, and other IoT devices. Exemplarily, the SA server can recognize and categorize each type of device according to the device's model type, brand name, software version, and manufacturer.

In Step 306, the SA server can analyze the received premises condition data to determine if there are any malfunctions, substandard operating reports, user-generated error reports, device generated error reports, and/or other indicators of errors, malfunctions, or substandard performance. If no error, malfunction, or other issue is found, method 300 returns to Step 302 to continue monitoring the system.

In Step 308, a solution to the error, malfunction, or other issue is determined. Exemplarily, the solution can be a mitigating action to the error or error indication. Exemplarily, the device type is identified. For example, where an IoT appliance is reporting an issue, such as a user-generated error report, the type of IoT device is determined. In addition, the solution to the error may be found through a standard checklist of troubleshooting step. In other embodiments, iterative processes can be employed to determine the solution to the error. In other embodiments, it can be determined that operative values of the type of device have to be adjusted. For example, the device may be tuned to an incorrect frequency or operating at an improper setting.

Next, in Step 310, the SA server can determine whether the error is indicative of a wider problem for that type of device. Thus, for example, if one IoT enabled refrigerator reports a malfunction, it can be determined that other refrigerators of that type are reporting similar errors or have an indication that the operating parameters of similar refrigerators that would indicate the likely occurrence of a similar error in the future. In some instances, the error may be unique to that device and not shared by other devices of that type. In that instance, method 300 can proceed to Step 302. One example of a unique error may be an alarm caused by a home invasion disturbance. An example of a shared error can be instances in which a media processor is incorrectly processing media content to produce a distorted image or an inaudible soundtrack.

If, on the other hand, it is determined that other devices of same type of device are or may experience the error, then method 300 can exemplarily proceed to Step 312. In Step 312, a system wide update according to the determined solution of Step 308 can be provided to all or some of the same type of devices, as well as to the device reporting the error, in the system. In some embodiments, the update can be performed simultaneously for all devices of that type in the system. For example, based on factors including the likelihood of success of the repair, the impact the changes will have on the device operating system, a size of the update to be transmitted, the distribution of the solution to the error can exemplarily be moderated.

In some embodiments, the system wide update can exemplarily include an iterative rollout of the solution. In some instances, multiple variations of the solution can be provided to different groups of the type of devices. In this embodiment, the system can monitor the separate devices to determine which variation of the solution had the most effective impact on the device type. Once the most effective or optimal solution is found, the other devices can be updated with that solution as well. In determining an optimal solution based on the iterative roll-out, the system in Step 312 can provide multiple updates to the various types of the device in the system. In other embodiments, the system can request permission to provide the solution.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
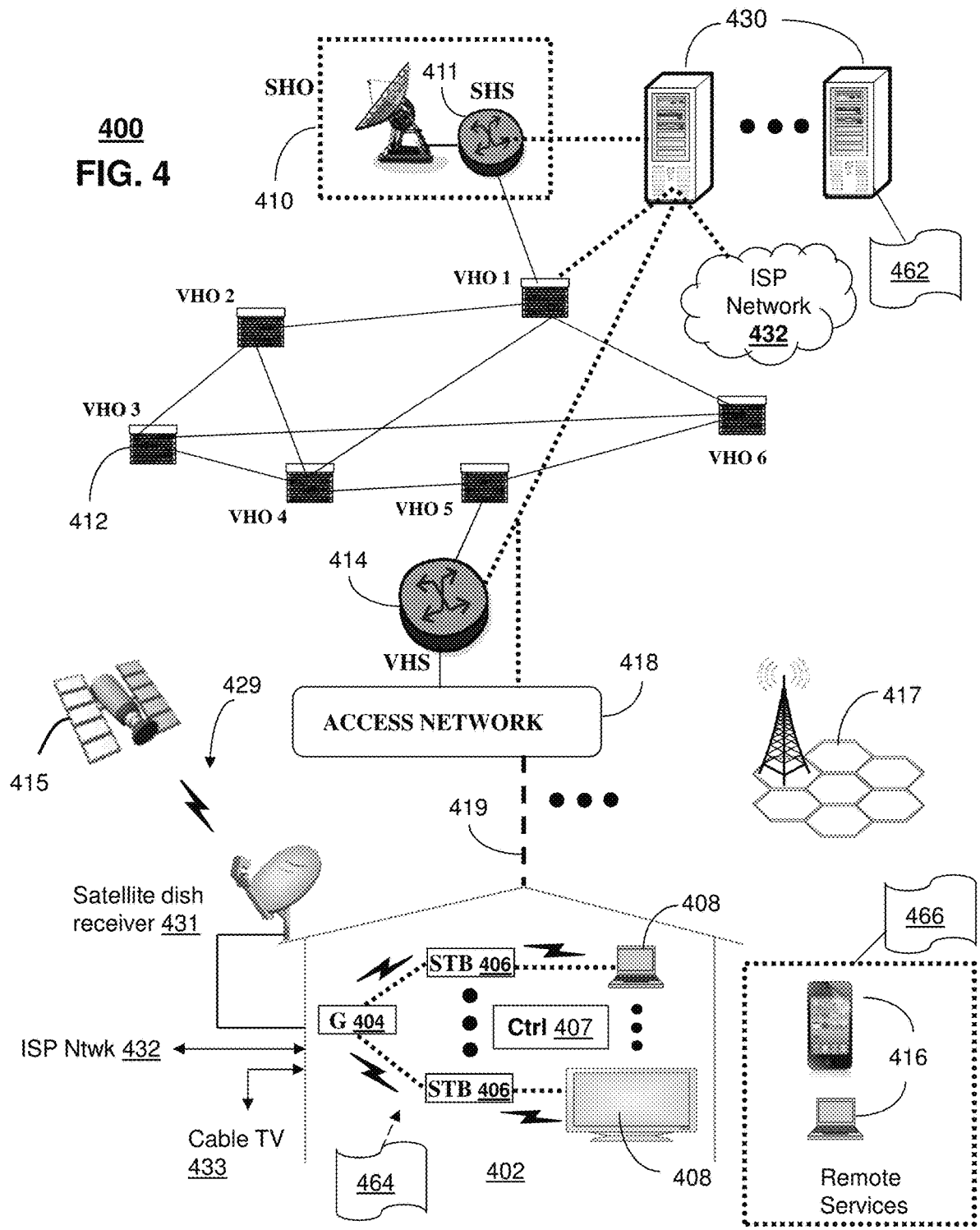
FIG. 4 depict an illustrative embodiment of a communication system that provide media services in systems 100 and 200 of FIGS. 1-2 to perform method 300.

FIG. 4 depicts an illustrative embodiment of a first communication system 400 for delivering media content. The communication system 400 can represent an Internet Protocol Television (ITV) media system. Communication system 400 can be overlaid or operably coupled with systems 100 and 200 of FIGS. 1 and 2 as another representative embodiment of communication system 400. For instance, one or more devices illustrated in the communication system 400 of FIG. 4 can perform a method that includes collecting operational data from a plurality of premises devices over a satellite service provider network for subscribers of the satellite provider network, wherein the operational data includes premises device data for each premises device of a subscriber, detecting an error indication in premises device data of one of the plurality of premises devices, determining a solution to the error indication in the operational data for the one of the plurality of premises devices, determining if the error indication in the operational data is indicative of a system wide error for a type of equipment of the one of the plurality of premises devices, and updating the type of equipment across the satellite service provider network with the solution responsive to determining that the error is indicative of a system wide error.

The ITV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the ITV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the ITV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the ITV system and/or the satellite TV system as another representative embodiment of communication system 400. In this embodiment, the cable TV system 433 can also provide Internet, telephony, and interactive media services. System 400 enables various types of interactive television and/or services including ITV, cable and/or satellite.

The subject disclosure can apply to other present or next generation over-the-air and/or landline media content services system.

Some of the network elements of the ITV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a SA server (herein referred to as SA server 430). The SA server 430 can use computing and communication technology to perform smart home surveillance 462, which can include among other things, system wide monitoring for IoT and satellite network provider errors described in method 300 of FIG. 3. For instance, smart home surveillance 462 of SA server 430 can be similar to the functions described for SA server 106 of FIG. 1 in accordance with method 300. The media processors 406 and wireless communication devices 416 can be provisioned with software functions 464 and 466, respectively, to utilize the services of SA server 430. For instance, the functions of the media processors 406 and wireless communication devices 416 can be similar to the functions described for the smart home device 104 in FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
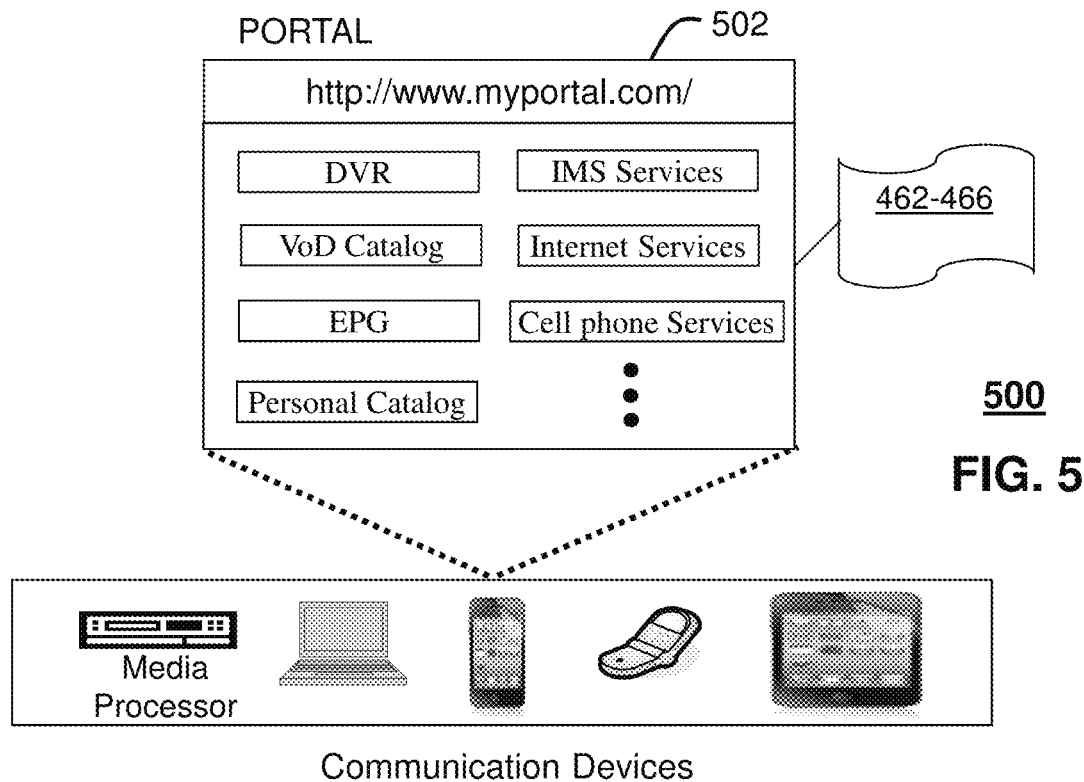
FIG. 5 depicts an illustrative embodiment of a web portal for interacting with the communication systems of systems 100 and 200 of FIGS. 1-2.

FIG. 5 depicts an illustrative embodiment of a web portal 502 of a communication system 500. Communication system 500 can be overlaid or operably coupled with systems 100 and 200 of FIGS. 1-2 and communication system 400 as another representative embodiment of systems 100 and 200 of FIGS. 1-2 and communication system 400. The web portal 502 can be used for managing services of systems 100 and 200 of FIGS. 1-2 and communication system 400. A web page of the web portal 502 can be accessed by a Uniform Resource Locator (URL) with an Internet browser using an Internet-capable communication device such as those described in FIGS. 1-2 and communication system 400. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462, 464, and 468 to adapt these applications as may be desired by subscribers and/or service providers of systems 100 and 200 of FIGS. 1-2 and communication system 400. For instance, subscribers of the interactive television network or satellite network provider can log into their on-line accounts and provision the servers 106 or server 430 with settings of the smart home environment that can change how often the home IoT devices, for example, report their status to the SA server 106 or receive updates from the SA server 106, and so on. Service providers can log onto an administrator account to provision, monitor and/or maintain the systems 100 and 200 of FIGS. 1-2 or server 430.

Figure 6:
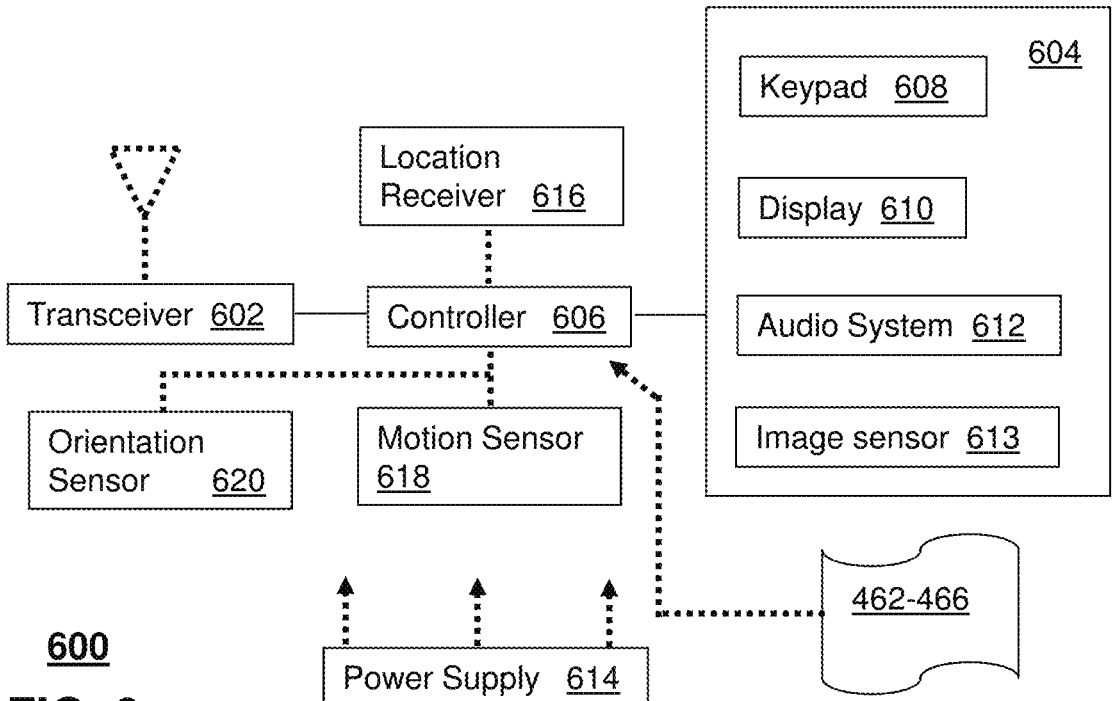
FIG. 6 depicts an illustrative embodiment of a communication device.

FIG. 6 depicts an illustrative embodiment of a communication device 600. Communication device 600 can serve in whole or in part as an illustrative embodiment of the devices depicted in systems 100 and 200 of FIGS. 1-2 and communication system 400 and can be configured to perform portions of method 300 of FIG. 3. As an example, communication device 600 can perform collecting operational data from a plurality of premises devices of a subscriber, wherein the operational data includes premises device data for each premises device of the plurality of premises devices, providing the operational data to media processor, wherein the media processor provides the operational data to a media provider network, wherein the media provider network detects an error indication in premises device data of one of the plurality of premises devices, wherein the media provider network determines a solution to the error indication in the premises device data for the one of the plurality of premises devices, receiving the solution from the media processor, and providing the solution to the one of the plurality of premises devices.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIGS. 1 and 2, the media processor 406, the media devices 408, or the portable communication devices 416 of FIG. 4. It will be appreciated that the communication device 600 can also represent other devices that can operate in systems 100 and 200 of FIGS. 1-2 and communication system 400 such as a gaming console and a media player. In addition, the controller 606 can be adapted in various embodiments to perform the functions 462, 464, and 466, respectively, such as performing the duties of a home agent device.

Upon reviewing the aforementioned embodiments, it would be evident to an artisan with ordinary skill in the art that said embodiments can be modified, reduced, or enhanced without departing from the scope of the claims described below. For example, the smart home monitoring system can perform home monitoring to detect persons using the devices while the owners are away and to then alert the user of the unexpected usage. In addition, the system can provide images taken by the IoT enabled devices to subscribers who are remote from their premises. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
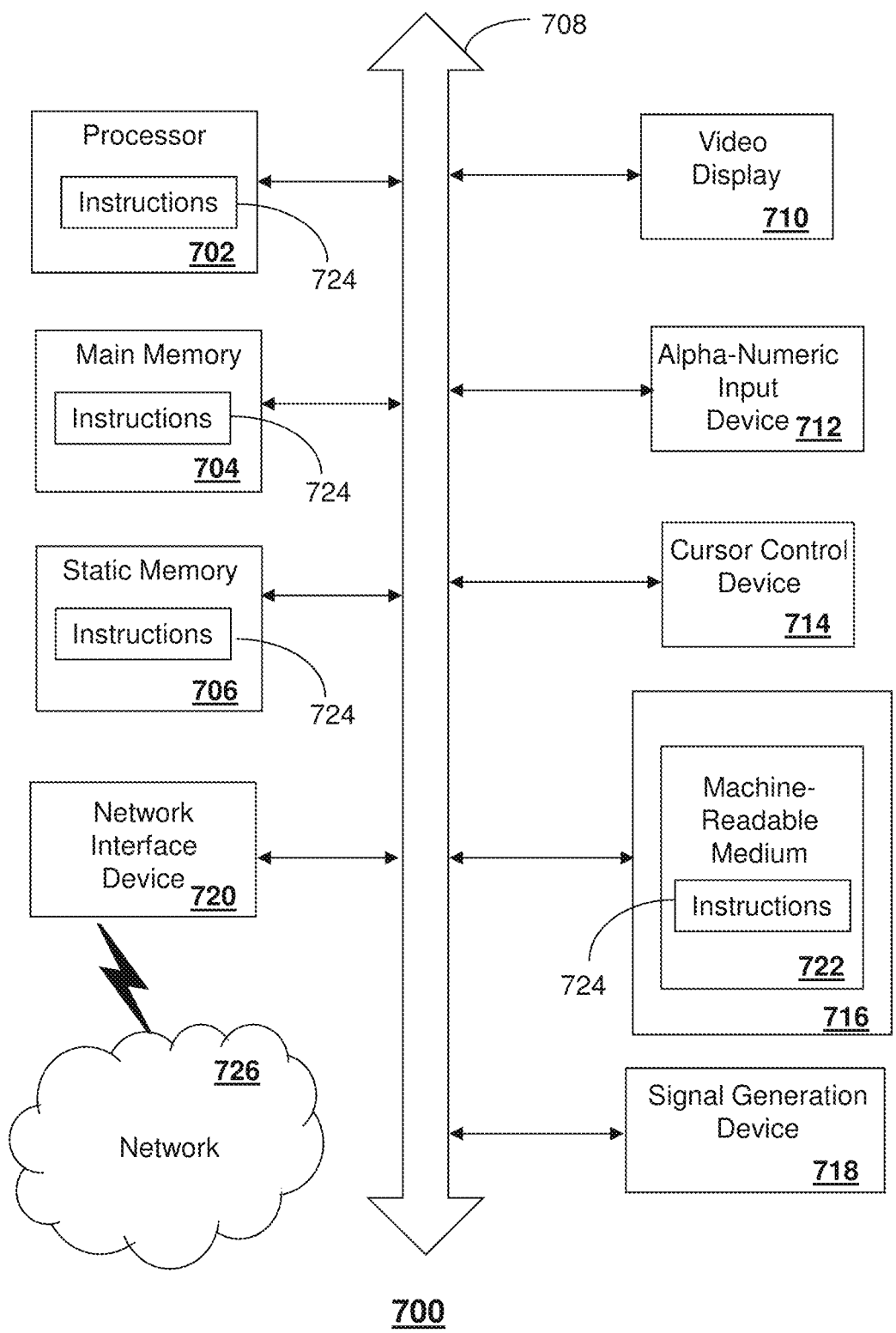
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the SA server 430, the media processor 406, the home agents, and the IoT enabled devices in the smart home environment and other devices of FIGS. 1 and 2. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
a processing system including a processor; and
a memory that stores executable instructions that, when executed by the processing system, facilitate performance of operations, comprising:
obtaining device condition data from a premises home agent equipment associated with a premises of a subscriber of a service provider network;
detecting, based on an anomaly indication in the device condition data, a problem associated with a premises device of a plurality of premises devices of the premises of the subscriber;
identifying multiple mitigation actions for the problem;
providing a first mitigation action of the multiple mitigation actions to the premises device; and
responsive to a determination that the problem constitutes a system-wide problem affecting devices of a same device type as the premises device, initiating a system-wide update, comprising:
providing the first mitigation action to a first group of devices of the same device type as the premises device;
providing a second mitigation action of the multiple mitigation actions to a second group of devices of the same device type as the premises device;
monitoring the first group of devices of the same device type as the premises device to determine an effectiveness of the first mitigation action; and
monitoring the second group of devices of the same device type as the premises device to determine an effectiveness of the second mitigation action.

2. The apparatus of claim 1, wherein the operations further comprise:
collecting a set of device condition data comprising, for each of a plurality of devices of the same device type as the premises device, respective device condition data comprising the anomaly indication;
inferring a pattern based on the set of device condition data; and
determining the first mitigation action based on the pattern.

3. The apparatus of claim 2, wherein the operations further comprise:
determining the multiple mitigation actions for the problem based on the set of device condition data; and
selecting the first mitigation action from among the multiple mitigation actions.

4. The apparatus of claim 3, wherein the operations further comprise:
selecting the second mitigation action from among the multiple mitigation actions.

5. The apparatus of claim 1, wherein the premises home agent equipment monitors operations for each of the plurality of premises devices of the premises of the subscriber.

6. The apparatus of claim 5, wherein the device condition data includes respective device condition data for each of the plurality of premises devices of the premises of the subscriber.

7. The apparatus of claim 1, wherein the operations further comprise receiving respective device condition data from each of multiple premises home agent equipment, wherein each of the multiple premises home agent equipment is associated with a respective service provider network subscriber premises.

8. The apparatus of claim 1, wherein the anomaly indication indicates an error, substandard operation, a malfunction, or a combination thereof.

9. A non-transitory machine-readable storage medium, comprising executable instructions that, when executed by a processing system including a processor, facilitate performance of operations, comprising:
receiving premises device data from a premises home agent equipment associated with a premises of a subscriber of a service provider network, wherein the premises home agent equipment monitors operations for each of a plurality of premises devices of the premises of the subscriber;
detecting, based on an anomaly indication comprised in the premises device data, a problem associated with a premises device of the plurality of premises devices of the premises of the subscriber;
identifying multiple mitigation actions for the problem;
providing a first mitigation action of the multiple mitigation actions to the premises device; and
responsive to a determination that the problem constitutes a system-wide problem affecting devices of a same device type as the premises device, initiating a system-wide update, comprising:
providing the first mitigation action to a first group of devices of the same device type as the premises device;
providing a second mitigation action of the multiple mitigation actions to a second group of devices of the same device type as the premises device;
monitoring the first group of devices of the same device type as the premises device to determine an effectiveness of the first mitigation action; and
monitoring the second group of devices of the same device type as the premises device to determine an effectiveness of the second mitigation action.

10. The non-transitory machine-readable storage medium of claim 9, wherein the operations further comprise:
obtaining a set of premises device data comprising, for each of a plurality of devices of the same device type as the premises device, respective premises device data comprising the anomaly indication;
inferring a pattern based on the set of premises device data; and
determining the first mitigation action based on the pattern.

11. The non-transitory machine-readable storage medium of claim 10, wherein the operations further comprise:
identifying the multiple mitigation actions for the problem based on the set of premises device data; and
selecting the first mitigation action from among the multiple mitigation actions.

12. The non-transitory machine-readable storage medium of claim 11, wherein the operations further comprise:
selecting the second mitigation action from among the multiple mitigation actions.

13. The non-transitory machine-readable storage medium of claim 9, wherein the premises device data includes respective premises device data for each of the plurality of premises devices of the premises of the subscriber.

14. The non-transitory machine-readable storage medium of claim 9, wherein the operations further comprise receiving respective premises device data from each of multiple premises home agent equipment, wherein each of the multiple premises home agent equipment is associated with a respective service provider network subscriber premises.

15. The non-transitory machine-readable storage medium of claim 9, wherein the anomaly indication indicates an error, substandard operation, a malfunction, or a combination thereof.

16. A method, comprising:
receiving, by a processing system comprising a processor, operational data from a premises home agent equipment of a premises of a service provider network subscriber, wherein the operational data comprises respective device condition data for each of a plurality of premises devices of the premises of the service provider network subscriber;
detecting, by the processing system, a problem associated with a premises device among the plurality of premises devices of the premises of the service provider network subscriber, wherein the problem is detected based on an anomaly indication comprised in device condition data for the premises device;
identifying, by the processing system, multiple mitigation actions for the problem;
providing, by the processing system, a first mitigation action of the multiple mitigation actions to the premises device; and
responsive to a determination that the problem is common to devices of a same device type as the premises device, initiating, by the processing system, a system-wide update, comprising:
providing the first mitigation action to a first group of devices of the same device type as the premises device;
providing a second mitigation action of the multiple mitigation actions to a second group of devices of the same device type as the premises device;
monitoring the first group of devices of the same device type as the premises device to determine an effectiveness of the first mitigation action; and
monitoring the second group of devices of the same device type as the premises device to determine an effectiveness of the second mitigation action.

17. The method of claim 16, comprising receiving, by the processing system, respective operational data from each of a plurality of premises home agent equipment, wherein each of the plurality of premises home agent equipment is associated with a respective service provider network subscriber premises.

18. The method of claim 16, wherein the anomaly indication indicates an error, substandard operation, a malfunction, or a combination thereof.

19. The method of claim 16, comprising:
obtaining, by the processing system, a set of device condition data comprising, for each of a plurality of devices of the same device type as the premises device, device condition data comprising the anomaly indication;
determining, by the processing system, the multiple mitigation actions based on the set of device condition data; and
selecting, by the processing system, the first mitigation action from among the multiple mitigation actions.

20. The method of claim 19, comprising:
selecting, by the processing system, the second mitigation action from among the multiple mitigation actions.

* * * * *